United States Patent
Lin et al.

(10) Patent No.: US 11,046,841 B2
(45) Date of Patent: *Jun. 29, 2021

(54) POLYETHYLENE FORMULATIONS WITH IMPROVED BARRIER AND TOUGHNESS FOR MOLDING APPLICATIONS

(71) Applicant: Dow Global Technologies LLC, Midland, MI (US)

(72) Inventors: Yijian Lin, Freeport, TX (US); Mridula Babli Kapur, Freeport, TX (US); David T. Gillespie, Freeport, TX (US); John L. Sugden, Midland, MI (US); Todd A. Hogan, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 326 days.

This patent is subject to a terminal disclaimer.

(21) Appl. No.: 16/064,267

(22) PCT Filed: Dec. 15, 2016

(86) PCT No.: PCT/US2016/066784
§ 371 (c)(1),
(2) Date: Jun. 20, 2018

(87) PCT Pub. No.: WO2017/112503
PCT Pub. Date: Jun. 29, 2017

(65) Prior Publication Data
US 2020/0277474 A1     Sep. 3, 2020

Related U.S. Application Data

(60) Provisional application No. 62/270,150, filed on Dec. 21, 2015.

(51) Int. Cl.
*C08L 23/06*     (2006.01)
*B29C 49/00*     (2006.01)
*C08K 5/00*      (2006.01)

(52) U.S. Cl.
CPC .......... *C08L 23/06* (2013.01); *B29C 49/0005* (2013.01); *C08K 5/0083* (2013.01);
(Continued)

(58) Field of Classification Search
CPC .. C08L 23/06; C08L 2201/14; C08L 2203/02; C08L 2203/10; C08L 2205/025;
(Continued)

(56) References Cited

U.S. PATENT DOCUMENTS 4,100,105 A     7/1978 Levine et al.
5,981,636 A *  11/1999 Amos et al. .......... C08K 5/098
                                                          524/108
(Continued)

FOREIGN PATENT DOCUMENTS

CN     101987891 A      3/2011
EP     1146077 A1      10/2001
(Continued)

OTHER PUBLICATIONS

Balke et al., "A Strategy for Interpreting Multidetector Size-Exclusion Chromatography Data II: Application in Plastic Waste Recovery", Chromatography of Polymers, Chapter 13, ACS Symposium Series 521.
(Continued)

*Primary Examiner* — Peter A Salamon
(74) *Attorney, Agent, or Firm* — Dinsmore & Shohl LLP (57) ABSTRACT

Polyethylene formulations, articles produced therefrom, and methods of making articles are provided. The polyethylene formulation includes a multimodal high density polyethylene (HDPE) composition, and 1 ppm to 10,000 ppm of a
(Continued)

nucleating agent, wherein the multimodal HDPE composition comprises a density of 0.940 g/cm$^3$ to 0.970 g/cm$^3$ when measured according to ASTM D792, and a melt index ($I_2$) of 0.01 g/10 min. to 1.0 g/10 min. when measured according to ASTM D1238 at 190° C. and a 2.16 kg load, and wherein the multimodal HDPE composition comprises an infrared cumulative detector fraction ($CDF_{IR}$) of greater than 0.27 and an infrared cumulative detector fraction to light scattering cumulative detector fraction ratio ($CDF_{IR}/CDF_{LS}$) from 0.7 to 2.0.

15 Claims, 2 Drawing Sheets

(52) U.S. Cl.
CPC ....... *C08L 2201/14* (2013.01); *C08L 2203/02* (2013.01); *C08L 2203/10* (2013.01); *C08L 2205/025* (2013.01); *C08L 2207/062* (2013.01)

(58) Field of Classification Search
CPC ............. C08L 2207/062; B29C 49/005; C08K 5/0083
See application file for complete search history.

(56) References Cited

U.S. PATENT DOCUMENTS

| | | | |
|---|---|---|---|
| 6,022,933 A | 2/2000 | Wright et al. | |
| 6,465,551 B1 * | 10/2002 | Zhao et al. | C07C 61/13 |
| | | | 524/284 |
| 6,599,971 B2 * | 7/2003 | Dotson et al. | C08K 5/098 |
| | | | 524/394 |
| 6,809,154 B2 | 10/2004 | Lindahl et al. | |
| 7,396,878 B2 | 7/2008 | Lustiger et al. | |
| 7,592,397 B2 | 9/2009 | Markovich et al. | |
| 7,714,071 B2 | 5/2010 | Hoenig et al. | |
| 8,022,143 B2 | 9/2011 | Wang | |
| 8,946,326 B2 | 2/2015 | Kulshreshtha et al. | |
| 8,962,755 B2 | 2/2015 | Wang et al. | |
| 2010/0081767 A1 | 4/2010 | McLeod et al. | |
| 2010/0084363 A1 | 4/2010 | Michie, Jr. et al. | |
| 2010/0159173 A1 | 6/2010 | Ashbaugh et al. | |
| 2013/0343808 A1 | 12/2013 | Domoy et al. | |
| 2014/0171582 A1 | 6/2014 | Wang et al. | |
| 2015/0094418 A1 | 4/2015 | Wang et al. | |
| 2015/0203671 A1 | 7/2015 | Aubee | |
| 2015/0353715 A1 * | 12/2015 | Wang | C08F 210/16 |
| | | | 215/329 |
| 2018/0371217 A1 * | 12/2018 | Yijian et al. | C08K 5/053 |

FOREIGN PATENT DOCUMENTS

| | | |
|---|---|---|
| EP | 1790580 A1 | 5/2007 |
| EP | 2130860 A1 | 12/2009 |
| EP | 2218751 A1 | 8/2010 |
| EP | 2360192 A1 | 8/2011 |
| EP | 2746334 A1 | 6/2014 |
| JP | 2001040151 A | 2/2001 |
| JP | 2001192513 A | 7/2001 |
| WO | 2004094489 A1 | 11/2004 |
| WO | 2004101674 A1 | 11/2004 |
| WO | 2005090464 A1 | 9/2005 |
| WO | 2007033297 A1 | 3/2007 |
| WO | 2007096894 A1 | 8/2007 |
| WO | 2007130515 A1 | 11/2007 |
| WO | 2008136849 A1 | 11/2008 |
| WO | 2009130200 A1 | 10/2009 |
| WO | 2010047743 A1 | 4/2010 |
| WO | 2010088265 A1 | 8/2010 |
| WO | 2011050042 A1 | 4/2011 |

OTHER PUBLICATIONS

International Search Report and Written Opinion pertaining to PCT/US2016/066784 dated Aug. 4, 2017.
International Search Report and Written Opinion pertaining to PCT/US2016/066817 dated Mar. 22, 2017.
Zimm et al., "Apparatus and Methods for Measurement and Interpretation of the Angular Variation of Light Scattering; Preliminary Results on Polystyrene Solutions", The Journal of Chemical Physics. 1948, vol. 16, No. 12, 1099-1116.
"Variables That Effect/Control High Density Polyethylene Film Oxygen /Moisture Barrier", William G. Todd, originally presented at ANTEC 2003.
Nucleation of Polyethylene Blown File, Dolan H. Place Conference, Sep. 17-21, 2006.

* cited by examiner

POLYETHYLENE FORMULATIONS WITH IMPROVED BARRIER AND TOUGHNESS FOR MOLDING APPLICATIONS

CROSS-REFERENCE TO RELATED APPLICATIONS

This application claims priority to U.S. Provisional Application 62/270,150, filed Dec. 21, 2015, which is incorporated herein by reference in its entirety.

TECHNICAL FIELD

Embodiments of the present disclosure generally relate to polyethylene formulations. More specifically, embodiments of the present disclosure relate to articles including the polyethylene formulations which provide improved barrier properties and improved toughness, comprising multimodal high density polyethylene (HDPE) and a nucleating agent.

BACKGROUND

HDPE is often used in manufacturing molded articles, such as plastic bottles and containers, to achieve adequate stiffness. It is important for these articles to possess adequate stiffness, demonstrated by tensile modulus, to prevent deformation when stacked during transportation and storage and to prevent breakage if accidentally dropped. It is also desirable to reduce the weight of the articles to decrease material and shipping costs; however, decreasing the weight unfavorably decreases the barrier performance. Barrier performance of the article is very important to prevent product spoilage. Even minimal reductions in the article's barrier to air, moisture and other contaminants can cause a dramatic impact on the shelf life of a product.

To combat these deficiencies, nucleating agents can be used. Nucleating agents are often used in polypropylene-based compositions; however, due to the fast crystallization rate, typically nucleating agents are not as effective when used with HDPE.

Accordingly, ongoing needs may exist for HDPE formulations to be used in manufacturing molded articles that exhibit sufficient stiffness, impact strength and improved barrier properties, while reducing the weight of the article.

SUMMARY

The present embodiments address these needs by utilizing polyethylene formulations comprising a multimodal HDPE composition and a nucleating agent to reduce the weight of blow molded articles while also providing improved drop impact toughness, tensile strength, and barrier properties.

In some embodiments of the present disclosure, a polyethylene formulation is provided. The polyethylene formulations comprise a multimodal HDPE composition, and 1 ppm to 10,000 ppm of a nucleating agent. The multimodal HDPE composition comprises a density of 0.940 g/cm$^3$ to 0.970 g/cm$^3$ when measured according to ASTM D792, and a melt index (I$_2$) of 0.01 g/10 min. to 1.0 g/10 min. when measured according to ASTM D1238 at 190° C. and a 2.16 kg load. Moreover, the multimodal HDPE composition comprises an infrared cumulative detector fraction (CDF$_{IR}$) of greater than 0.27 and an infrared cumulative detector fraction to light scattering cumulative detector fraction ratio (CDF$_{IR}$/CDF$_{Ls}$) from 0.7 to 2.0, wherein the CDF$_{IR}$ is computed by measuring the area fraction of an IR5 measurement channel (IR) detector chromatogram less than 15,000 g/mol molecular weight using Gel Permeation Chromatography (GPC), and wherein the CDF$_{Ls}$ is computed by measuring the area fraction of a low angle laser light scattering (LALLS) detector chromatogram greater than 1,000,000 g/mol molecular weight using GPC.

In additional embodiments of the present disclosure, an article made from the polyethylene formulation is provided. The article may comprise a molded article or a fabricated article.

Additional embodiments of the disclosure relate to methods of making a pharmaceutical bottle by forming the above polyethylene formulations into the pharmaceutical bottle by using at least one of an extrusion blow molding process, an injection blow molding process, or a compression blow forming process.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the drawings enclosed herewith.

The embodiments set forth in the drawings are illustrative in nature and not intended to be limiting to the claims. Moreover, individual features of the drawings will be more fully apparent and understood in view of the detailed description.

DETAILED DESCRIPTION

Embodiments of the present disclosure are directed to polyethylene formulations and articles produced therefrom, comprising a multimodal HDPE composition and a nucleating agent for use in blow molding applications. The embodiments of the polyethylene formulations include, among other things, a multimodal HDPE polymer and 1 ppm to 10,000 ppm of a nucleating agent. The multimodal HDPE composition has a density of 0.940 g/cm$^3$ to 0.970 g/cm$^3$ when measured according to ASTM D792, and a melt index (I$_2$) of 0.01 g/10 min. to 1.0 g/10 min. when measured according to ASTM D1238 at 190° C. and a 2.16 kg load. Moreover, the multimodal HDPE composition has a CDF$_{IR}$ of greater than 0.27 and an infrared cumulative detector fraction to light scattering cumulative detector fraction ratio (CDF$_{IR}$/CDF$_{LS}$) from 0.7 to 2.0, wherein the CDF$_{IR}$ is computed by measuring the area fraction of an IR detector chromatogram less than 15,000 g/mol molecular weight using GPC, and wherein the CDF$_{LS}$ is computed by measuring the area fraction of a LALLS detector chromatogram greater than 1,000,000 g/mol molecular weight using GPC. Another embodiment of the present disclosure includes, among other things, an article produced from the polyethylene formulation comprising a molded article, or a fabricated article. Another embodiment of the present disclosure includes methods of making a polyethylene formulation into a pharmaceutical bottle. The following description of the embodiments is illustrative in nature and is in no way intended to be limiting in its application or use.

The term "polyethylene formulation," as used herein, means any composition comprising a polyethylene polymer solely, or with additional components, such as an additional polymer or a nucleating agent.

The term "polyethylene polymer," as used herein, refers to a polymer made of 100% ethylene-monomer units (a homopolymer) or refers to copolymers (for example, an interpolymer) produced with other monomeric moieties, such as α-olefins (including, but not limited to, propylene, 1-butene, 1-pentene, 1-hexene, 1-octene, and so forth) wherein the copolymer comprises greater than 50% of its units from ethylene. Various polyethylene polymers are contemplated as suitable. For example and not by way of limitation, the polyethylene polymer may comprise HDPE, wherein the HDPE is a polyethylene polymer with a density greater than 0.940 g/cm³

The term "interpolymer," as used herein, refers to polymers prepared by the polymerization of at least two different types of monomers. Interpolymer is a generic term which includes copolymers, usually employed to refer to polymers prepared from two different types of monomers, and polymers prepared from more than two different types of monomers.

The term "nucleating agent," as used herein, refers to a compound which increases the overall rate of crystallization or nucleation of a polymer.

The term "multimodal," as used herein, means that the molecular weight distribution (MWD) in a GPC curve exhibits two or more component polymers, for example, two or more peaks or wherein one component polymer may even exist as a hump, shoulder, or tail, relative to the MWD of the other component polymers; or in the alternative, wherein two or more components may have only one single peak with no bumps, shoulders, or tails, but the components can be separated by deconvolution of the GPC chromatogram curve.

In one or more embodiments of the present disclosure, the multimodal HDPE may be a bimodal HDPE. The term "bimodal," as used herein, means that the MWD in a GPC curve exhibits two component polymers wherein one component polymer may even exist as a hump, shoulder or tail relative to the MWD of the other component polymer. A bimodal MWD can be deconvoluted into two primary components: a first ethylene polymer component and a second ethylene polymer component. As described further below, the first ethylene polymer component may have a higher density than the second ethylene polymer component as determined from the following equation:

$$\frac{1}{overall.density.} = \frac{weight.fraction.of.1st.ethylene.component}{density.of.1st.ethylene.component} + \frac{weight.fraction.of.2nd.ethylene.component}{density.of.2nd.ethylene.component}$$ (Equation 1)

Moreover, the first ethylene polymer component may have a lower weight-average molecular weight than the second ethylene polymer component. After deconvolution, the peak width at half maxima (WAHM), the number-average molecular weight (Mn), weight-average molecular weight (Mw), and weight fraction of each component can be obtained.

The first ethylene polymer component and/or the second ethylene polymer component of the composition may be an ethylene-based interpolymer, ethylene homopolymer, ethylene/α-olefin interpolymer, homogeneously branched ethylene-based interpolymer or copolymer, or a heterogeneously branched ethylene-based interpolymer or copolymer. Without being bound by theory, homogeneously branched interpolymers may be produced, for example, by single-site catalyst systems, and contain a substantially homogeneous distribution of comonomer among the molecules of the interpolymer. Heterogeneously branched interpolymers may be produced by Ziegler-Natta type catalysts or chromium-based catalysts, and contain a non-homogeneous distribution of comonomer among the molecules of the interpolymer. The comonomer may be an α-olefin. In some embodiments, the first ethylene polymer component and/or the second ethylene polymer component may be polymerized using Ziegler-Natta catalysts to form a bimodal polymer. In other embodiments, the first ethylene polymer component and/or the second ethylene polymer component may be polymerized using chromium-based catalysts. Suitable methods to polymerize ethylene monomers using chromium-based catalysts are generally known in the art, and may include gas-phase, solution phase and slurry-phase polymerization processes. In some embodiments, the first ethylene polymer component and/or the second ethylene polymer component may be polymerized in a gas-phase process, using a chromium catalyst, and in particular, a titanated chromium catalyst. Chromium catalysts and polymerization methods are further described in EP2218751, WO2004/094489, U.S. Pat. Nos. 4,100,105, and 6,022,933, which are incorporated herein in their entirety by reference. In some embodiments, the first ethylene polymer component and/or the second ethylene polymer component is an ethylene/α-olefin interpolymer, and further an ethylene/α-olefin copolymer. Trace amounts of impurities, for example, catalyst residues, may also be incorporated into and/or within the first ethylene polymer component.

In accordance with one or more embodiments of the present disclosure, the multimodal HDPE composition may have a density from 0.940 g/cm³ to 0.970 g/cm³ when measured according to ASTM D792. The multimodal HDPE composition may have a density from 0.940 g/cm³ to 0.970 g/cm³, or from 0.940 g/cm³ to 0.965 g/cm³, or from 0.940 g/cm³ to 0.960 g/cm³, or from 0.940 g/cm³ to 0.955 g/cm³, or from 0.945 g/cm³ to 0.970 g/cm³, or from 0.945 g/cm³ to 0.965 g/cm³, or from 0.945 g/cm³ to 0.960 g/cm³, or from 0.945 g/cm³ to 0.955 g/cm³, or from 0.950 g/cm³ to 0.970 g/cm³, or from 0.950 g/cm³ to 0.965 g/cm³, or from 0.950 g/cm³ to 0.960 g/cm³, or from 0.950 g/cm³ to 0.955 g/cm³, or from 0.955 g/cm³ to 0.970 g/cm³, or from 0.955 g/cm³ to 0.965 g/cm³, or from 0.955 g/cm³ to 0.960 g/cm³.

In accordance with some embodiments of the present disclosure, the multimodal HDPE composition may have a melt index ($I_2$) from 0.01 g/10 minutes to 1 g/10 minutes when measured according to ASTM D1238 at 190° C. and a 2.16 kg load. The multimodal HDPE composition may, in some embodiments, have an $I_2$ from 0.1 g/10 minutes to 0.4 g/10 minutes, or from 0.1 g/10 minutes to 1.0 g/10 minutes, or from 0.2 g/10 minutes to 1.0 g/10 minutes, or from 0.3 g/10 minutes to 1.0 g/10 minutes, or from 0.2 g/10 minutes to 0.5 g/10 minutes, or from 0.1 g/10 minutes to 0.5 g/10 minutes, or from 0.25 g/10 minutes to 0.45 g/10 minutes, or from 0.25 g/10 minutes to 0.4 g/10 minutes, or from 0.5 g/10 minutes to 1.0 g/10 minutes.

In some embodiments, the multimodal HDPE composition may have a $CDF_{IR}$ greater than 0.27. In other embodiments, the $CDF_{IR}$ may be greater than 0.275, or greater than 0.280, or greater than 0.300, or greater than 0.320. Without being bound by theory, a $CDF_{IR}$ greater than 0.27 indicates that the bimodal resin has a sufficient amount of molecules within the multimodal resin having a molecular weight less than 15,000 g/mol. This may indicate a desired response to the nucleating agent upon crystallization because the small molecular weight molecules crystallize more rapidly than the large molecular weight molecules. In some embodiments, this $CDF_{IR}$ parameter greater than 0.27 correlates to an improved gas barrier while maintaining toughness within the resin.

Figure 1:
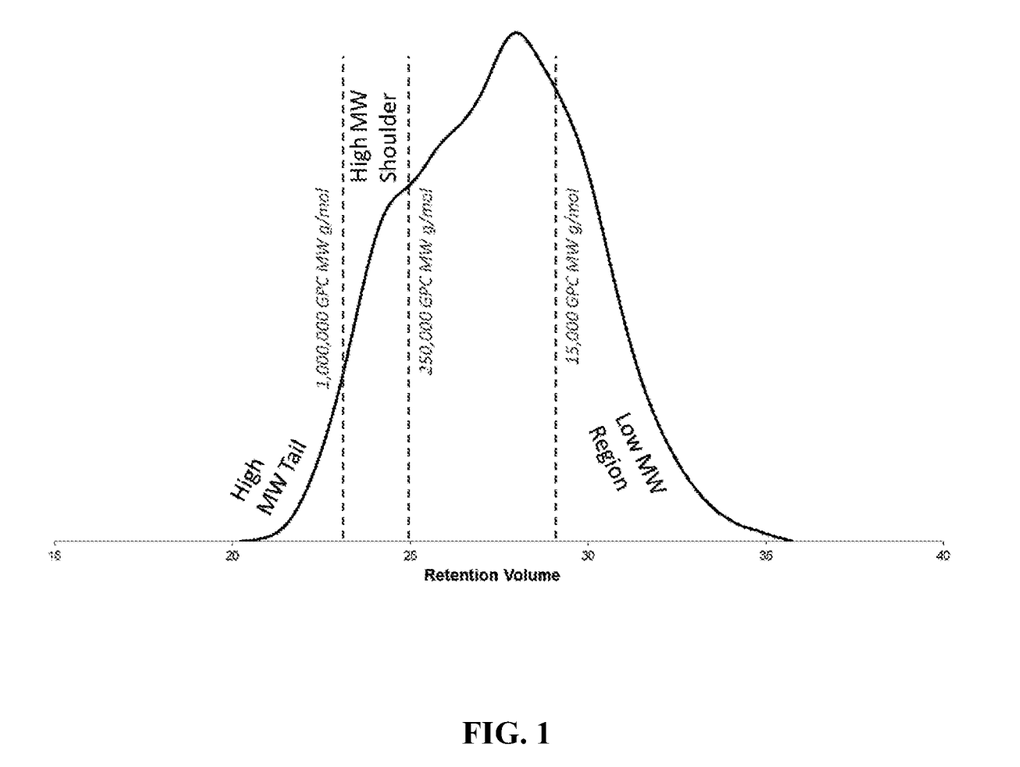
FIG. 1 is a graphical depiction of an IR5 Measurement (IR5) chromatogram integration window used in the calculation of CDF$_{IR}$ as detailed further below.

According to one or more embodiments, the multimodal HDPE composition may have a ratio of the $CDF_{IR}$ divided by the $CDF_{LS}$ from 0.70 to 2.00. In other embodiments, the $CDF_{IR}/CDF_{LS}$ ratio may be from 0.70 to 1.5, or from 0.70 to 1.0, or from 0.70 to 0.75. Without being bound by theory, this ratio may indicate a suitable amount of high molecular weight shoulder without an excessive high molecular weight tail. Referring to FIG. 1, the term "high molecular weight shoulder," as used herein, refers to the area on a GPC chromatogram from 250,000 g/mol GPC molecular weight to 1,000,000 g/mol GPC molecular weight. Further referring to FIG. 1, the term "high molecular weight tail," as used herein, refers to the area on a GPC chromatogram of greater than 1,000,000 g/mol GPC molecular weight.

As mentioned, the $CDF_{IR}/CDF_{LS}$ ratio may indicate a suitable amount of high molecular weight shoulder without an excessive high molecular weight tail. For example, if the $CDF_{IR}/CDF_{LS}$ ratio is less than 0.70, the multi-modal resin may have too much high molecular weight tail within the multimodal resin. Moreover, if the $CDF_{IR}/CDF_{LS}$ ratio is greater than 2.00, the multi-modal resin may have too little high molecular weight shoulder within the multimodal resin. While some level of high molecular component (for example, high molecular weight shoulder) is important to provide the desired toughness of the resin, too much high molecular tail may cause the molecules in the component to align in the flow direction during the molding process, preventing optimal nucleating by competing with the nucleating agent to crystallize the HDPE. The crystals nucleated by the high molecular weight tail may orient in the edge-on direction (the c-axis of polyethylene crystals lies in the plane of flow direction and cross direction), whereas crystals nucleated by the nucleating agent may orient in the in-plane direction (the c-axis of polyethylene crystals is perpendicular to the plane of flow direction and cross direction). Crystals oriented in the edge-on direction may not block gas transmission like crystals oriented in the in-plane direction.

As stated above, the first ethylene polymer component may have a lower molecular weight and a higher density than the second ethylene polymer component. In one or more embodiments, the multimodal HDPE may comprise from 40 weight percent (wt. %) to 80 wt. % of the first ethylene polymer component. In other embodiments, the multimodal HDPE may comprise from 50 wt. % to 70 wt. %, or from 50 wt. % to 60 wt. % of the first ethylene polymer component. In one or more embodiments, the first ethylene polymer component may be an HDPE homopolymer.

In some embodiments, the multimodal HDPE may comprise 20 wt. % to 60 wt. % of the second ethylene polymer component. The multimodal HDPE may comprise from 25 wt. % to 50 wt. %, or from 35 wt. % to 50 wt. %, or from 35 wt. % to 45 wt. % of the second ethylene polymer component. In some embodiments, the second ethylene polymer component may be an HDPE interpolymer.

For example, and not by way of limitation, a suitable commercial example of the multimodal HDPE includes CONTINUUM™ DMDD-6620, available from The Dow Chemical Company (Midland, Mich.).

In accordance with embodiments described herein, the multimodal HDPE composition may be produced by a variety of methods. For example, the multimodal HDPE composition may be made by blending or mixing the first ethylene polymer component and the second ethylene polymer component together. Alternatively, the composition may be made in a single reactor or a multiple reactor configuration, where the multiple reactors may be connected in series or parallel, and where each polymerization takes place in solution, in slurry, in the gas phase, or a combination of reaction systems (e.g. combination of slurry and gas phase reactor). In some embodiments, a dual reactor configuration is used where the polymer made in the first reactor can be either the first ethylene polymer component or the second ethylene polymer component. The polymer made in the second reactor may have a density and melt index that the overall density and melt index of the composition is met. Similar polymerization processes are described in, for example, WO 2004/101674A, which is incorporated herein by reference in its entirety.

In some embodiments herein, a method of manufacturing the compositions described herein may comprise blending a first ethylene polymer component, as described herein, with a second ethylene polymer component, as described herein, thereby producing a polyethylene composition. In other embodiments, a method of manufacturing the compositions described herein may comprise polymerizing a first ethylene polymer component, as described herein, in a reactor, and polymerizing a second ethylene polymer component, as described herein, in a reactor, thereby producing a polyethylene composition. The two reactors may be operated in series. In some embodiments, the first ethylene polymer component is polymerized in a first reactor, and the second ethylene polymer component is polymerized in a second reactor. In other embodiments, the second ethylene polymer component is polymerized in a first reactor, and the first ethylene polymer component is polymerized in a second reactor.

For the nucleating agent, various embodiments are contemplated. In some embodiments of the present disclosure, the nucleating agent may be an organic nucleating agent. For example and not by way of limitation, the organic nucleating agent may comprises one or more of metal carboxylates, metal aromatic carboxylate, hexahydrophthalic acid metal salts, stearates, organic phosphates, bisamides, sorbitols, and mixtures thereof. For example and not by way of limitation, suitable commercial examples of nucleating agents may include one or more of Hyperform® HPN-68L (which is primarily a disodium salt of bicyclo[2.2.1]heptane-2,3-dicarboxylic acid), Hyperform® HPN-20E (which is a mixture of zinc stearate and a calcium salt of 1,2-cyclohexanedicarboxylic acid), or Hyperform® HPN-600ei (which is primarily a disodium salt of bicyclo[2.2.1]heptane-2,3-dicarboxylic acid), or Hyperform® HPN-210M, which are available from Milliken Chemical (Spartanburg, S.C.).

In some embodiments of the present disclosure, from 1 parts per million (ppm) to 10,000 ppm of nucleating agent may be used. In some embodiments, the amount of nucleating agent used may be from 10 ppm to 7,000 ppm, or from 500 ppm to 1,500 ppm or from 750 ppm to 1,250 ppm, or from 1 ppm to 2,000 ppm, or from 10 ppm to 4,000 ppm, or from 100 ppm to 2,000 ppm, or from 100 ppm to 2,500 ppm, or from 750 ppm to 2,000 ppm, or from 750 ppm to 2,500 ppm, or from 1,000 ppm to 2,000 ppm, or from 1,000 ppm to 3,000 ppm, or from 1,000 ppm to 3,000 ppm, or from 800 ppm to 2,000 ppm, or from 800 ppm to 1,500 ppm, or from 50 ppm to 500 ppm, or from 50 ppm to 2,500 ppm, or from 50 ppm to 1,500 ppm, or from 500 ppm to 3,500 ppm, or from 500 ppm to 4,000 ppm.

Another embodiment of the present disclosure includes, among other things, an article produced from the polyethylene formulation. In some embodiments, the article may be a molded or a fabricated article. The article may comprise an injection-molded film, an injection-molded article, a blown film, a blow molded article, a molded article, a melt-spun fiber, or an extruded article.

The article may, in some embodiments, be a blow molded article comprising the polyethylene formulation. In some embodiments, the article may comprise a blow molded bottle, container, closure device, carton, canister, bottle cap, beverage closure device, package. In some embodiments, the article may be a blow molded pharmaceutical bottle or a blow molded barrier bottle. In one or more embodiments, the article may have advantageous or desirable properties. For instance, the article may, among other things, provide improved barrier properties, sufficient stiffness, and reduced article weight.

The article may be formed through a variety of processes, including but not limited to extrusion blow molding (EBM), injection blow molding (IBM) and compression blow forming (CBF) processes. Embodiments of the disclosure also relate to methods of making a bottle for use in the pharmaceutical industry by forming a polyethylene formulation into a bottle using at least one of an extrusion blow molding process, an injection blow molding process, or a compression blow molding process. The polyethylene formulation may be in accordance with any of the embodiments previously described.

In some embodiments, the article may be an extrusion blow molded article, such as an extrusion blow molded bottle, including bottles for use in the pharmaceutical industry. Embodiments of the disclosure may additionally relate to methods of forming a polyethylene formulation into an article, such as a bottle, by using an extrusion blow molding process. Without being bound by any particular theory, extrusion blow molding refers to a process in which plastic is melted and extruded into a hollow tube, referred to as a parison. The parison is then captured by closing it into a cooled metal mold. Air may then be blown into the parison to inflate it into the shape of the hollow article, such as a hollow bottle, container, or other object. After the plastic has sufficiently cooled, the mold is opened and the produced article is ejected.

Similarly, in some embodiments, the article may be an injection blow molded article, such as an injection mold molded bottle, including bottles for use in the pharmaceutical industry. Embodiments of the disclosure may additionally relate to methods of forming a polyethylene formulation into an article, such as a bottle, by using an injection blow molding process. Without being bound by any particular theory, injection blow molding refers to a process in which large quantities of hollow glass and plastic objects may be made that includes three main steps: injection, blowing, and ejection. First, a polymer may be injection molded onto a core pin that is rotated to a blow molding station to be inflated and cooled. The injection blow molding machine may be based on an extruder barrel and screw assembly that may melt the polymer. The molten polymer may then be fed into a hot runner manifold and may be injected through nozzles into a heated cavity and core pin. The cavity mold may form the external shape of the preform and may be clamped around a core rod that forms the internal shape of the preform. The preform may consist of a fully-formed bottle or jar neck with a thick tube of polymer attached that will form a body, similar in appearance to a test tube with a threaded neck. Next, the preform mold may be opened and the core may be rotated and clamped into the hollow, chilled blow mold. The end of the core rod may open, allowing compressed air into the preform to inflate it into the finished article shape. Finally, after a cooling period, the blow mold may be opened and the core rod may be opened to an ejection position. The finished article may be stripped off of the core rod and optionally may be leak-tested prior to packaging. The produced article, such as a bottle, may in some embodiments have numerous cavities, as machines typically utilize at least three core rods to allow concurrent preform injection, blow molding, and ejection.

In some embodiments, the article may be a compression blow formed article, such as a compression blow formed bottle, including bottles for use in the pharmaceutical industry. Embodiments of the disclosure may relate to methods of forming a polyethylene formulation into an article, such as a bottle, by using a compression blow forming process. Without being bound by any particular theory, compression blow forming refers to a process that allows producers to obtain a container directly from granulated material based on a unique, innovative thermoplastic material conversion process. The conversion process is based on the continuous extrusion of plastic material, which is cut into doses of a predetermined size, referred to as gobs. The gobs may then be placed in an open mold and molded into a preform through a compression process. Inside the mold the preform may be thermo-regulated to a temperature that allows stretch-blow molding to form an article. The articles, which may in some embodiments be bottles, may then exit the machine in an orderly line.

In accordance with one or more embodiments of the present disclosure, the article may provide an improved barrier, including, but not limited to an improved gas barrier. In some embodiments, the article may provide an oxygen transmission rate (OTR) of less than 100 cc·mil/(100 in$^2$)/day at 23° C. and 0% relative humidity when measured according to ASTM D3985. Alternatively, the article may provide an OTR of less than 95 cc·mil/(100 in$^2$)/day, or less than 90 cc·mil/(100 in$^2$)/day, or less than 75 cc·mil/(100 in$^2$)/day. In some embodiments of the present disclosure, the article may provide an OTR improvement of at least 20% upon adding the nucleating agent due to the inventive formulation. In other embodiments, the article may provide an OTR improvement of at least 25%, or at least 30%, or at least 50% upon adding the nucleating agent due to the inventive formulation. It should be understood that an improved OTR is indicative of other improved barrier qualities, and the article, in some embodiments, may additionally provide an improved water vapor barrier, an improved carbon dioxide barrier, or an improved nitrogen barrier.

In some embodiments of the present disclosure, the article may have an improved drop test performance when measured according to ASTM D2463, Procedure B: Bruceton Staircase Method due to the inventive formulation. This is explained further in the Examples below (see Table 2).

GPC Testing Standards

Conventional Gel Permeation Chromatography (GPC)

The GPC system used herein consisted of a PolymerChar GPC-IR (Valencia, Spain) high temperature GPC chromatograph equipped with an internal IR5 infrared detector (IR5).

The autosampler oven compartment was set at 160° C. and the column compartment was set at 150° C. The columns used were 4 Agilent Technologies "Mixed A" 30 cm by 20-micron linear mixed-bed columns and a 20-µm pre-column. The chromatographic solvent was 1,2,4 trichlorobenzene and contained 200 ppm of butylated hydroxytoluene (BHT). The solvent source was nitrogen sparged and the system was equipped with an on-line degasser from Agilent Technologies. The injection volume was 200 microliters and the flow rate was 1.0 milliliters/minute.

Calibration of the GPC column set was performed with 21 narrow molecular weight distribution polystyrene standards with molecular weights ranging from 580 g/mol to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80 degrees Celsius with gentle agitation for 30 minutes. The polystyrene standard peak molecular weights were converted to polyethylene molecular weights using Equation 2 (as described in Williams and Ward, J. Polym. Sci., Polym. Let., 6, 621 (1968)):

$$M_{polyethylene} = A \times (M_{polystyrene})^B \quad \text{(Equation 2)}$$

where M is the molecular weight, A has a value of 0.4315 and B is equal to 1.0.

A third order polynomial was used to fit the respective polyethylene-equivalent calibration points. A small adjustment to A (from approximately 0.415 to 0.44) was made to correct for column resolution and band-broadening effects such that NIST standard NBS 1475 is obtained at 52,000 g/mol Mw.

The total plate count of the GPC column set was performed with Eicosane (prepared at 0.04 g in 50 milliliters of TCB and dissolved for 20 minutes with gentle agitation.) The plate count (Equation 3) and symmetry (Equation 4) were measured on a 200 microliter injection according to the following equations:

$$\text{Plate Count} = 5.54 * \left( \frac{RV_{Peak\ Max}}{\text{Peak Width at } \frac{1}{2} \text{height}} \right)^2 \quad \text{(Equation 3)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ Max})}{(RV_{Peak\ Max} - \text{Front Peak } RV_{one\ tenth\ height})} \quad \text{(Equation 4)}$$

where RV is the retention volume in milliliters and the peak width is in milliliters, "Peak Max" is the maximum position of the peak, one tenth height is the 1/10 height of the peak maximum, "Rear Peak" refers to the peak tail at later retention volumes than the Peak Max, and "Front Peak" refers to the peak front at earlier retention volumes than the Peak Max. The plate count for the chromatographic system was greater than 24,000 and symmetry was between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of number-average molecular weight ($Mn_{(GPC)}$), and weight-average molecular weight ($Mw_{(GPC)}$) were based on GPC results using the internal IR5 detector (measurement channel) of the PolymerChar GPC-IR chromatograph according to Equations 5-6 below, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 2.

$$Mn_{(GPC)} = \frac{\sum_i IR_i}{\sum_i (IR_i / M_{polyethylene_i})} \quad \text{(Equation 5)}$$

$$Mw_{(GPC)} = \frac{\sum_i (IR_i * M_{polyethylene_i})}{\sum_i IR_i} \quad \text{(Equation 6)}$$

In order to monitor the deviations over time, a flowrate marker (decane) was introduced into each sample via a micropump controlled with the PolymerChar GPC-IR system. This flowrate marker (FM) was used to linearly correct the pump flowrate ($\text{Flowrate}_{(nominal)}$) for each sample by retention volume (RV) alignment of the respective decane peak within the sample ($RV_{(FM\ Sample)}$) to that of the decane peak within the narrow standards calibration ($RV_{(FM\ Calibrated)}$). Any changes in the time of the decane marker peak are then assumed to be related to a linear-shift in flowrate ($\text{Flowrate}_{(effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. Processing of the flow marker peak was done via the PolymerChar GPCOne™ Software. Acceptable flowrate correction is such that the effective flowrate should be within +/−2% of the nominal flowrate.

$$\text{Flowrate}_{(effective)} = \text{Flowrate}_{(nominal)} * (RV_{(FM\ Calibrated)} / RV_{(FM\ Sample)}) \quad \text{(Equation 7)}$$

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, do/dc, of 0.104. Generally, the mass detector response (IR5) and the light scattering constant (determined using GPCOne™) should be determined from a linear standard with a molecular weight in excess of about 50,000 g/mol.

Deconvolution of GPC Chromatogram

The fitting of the chromatogram into a high molecular weight and low molecular weight component fraction was accomplished using a Flory Distribution which was broadened with a normal distribution function as follows:

For the log M axis, 501 equally-spaced Log(M) points, spaced by 0.01, were established between 2 and 7 representing the molecular weight range between 100 g/mol and 10,000,000 g/mol where Log is the logarithm function to the base 10.

At any given Log (M), the population of the Flory distribution was in the form of Equation 8:

$$dW_f = \left(\frac{2}{M_w}\right)^3 \left(\frac{M_w}{0.868588961964}\right) M^2 e^{\left(-2M/M_w\right)} \quad \text{(Equation 8)}$$

where $M_w$ is the weight-average molecular weight of the Flory distribution and M is the specific x-axis molecular weight point, (10 ^ [Log(M)]).

The Flory distribution weight fraction was broadened at each 0.01 equally-spaced log(M) index according to a normal distribution function, of width expressed in Log(M), σ; and current M index expressed as Log(M), μ.

$$f_{(LogM,\mu,\sigma)} = \frac{e^{-\frac{(LogM-\mu)^2}{2\sigma^2}}}{\sigma\sqrt{2\pi}} \quad \text{(Equation 9)}$$

It should be noted that before and after the spreading function has been applied that the area of the distribution (dW$_f$/d Log M) as a function of Log(M) is normalized to unity.

Two weight-fraction distributions, $dW_{f1}$ and $dW_{f2}$, for fractions 1 and 2 were expressed with two unique Mw target values, $Mw_1$ and $Mw_2$, and with overall component compositions $A_1$ and $A_2$. Both distributions were broadened with the same width, σ. A third component ($dW_{fE}$) was considered as an error function and had a component composition of $A_E$, and a broadened width of $\sigma_E$. The three distributions were summed as follows:

$$dW_f = A_1 dW_{f1} + A_2 dW_{f2} + A_E dW_{fE} \quad \text{(Equation 10)}$$

Where: $A_1+A_2+A_E=1$

The weight fraction result of the measured (from Conventional GPC) GPC molecular weight distribution was interpolated along 501 log M points using a $2^{nd}$-order polynomial.

Microsoft Excel™ 2010 Solver was used to minimize the sum of squares of residuals for the equally-spaces range of 501 Log M points between the interpolated chromatographically determined molecular weight distribution and the three broadened Flory distribution components ($\sigma_{1 \text{ and } 2}$ and $\sigma_E$), weighted with their respective component compositions, $A_1$, $A_2$, and $A_E$.

The iteration starting values for the components are as follows:

Component 1: Mw=30,000 g/mol, σ=0.300, and A=0.475
Component 2: Mw=250,000 g/mol, σ=0.300, and A=0.475
Error Component: Mw=4,000 g/mol, σ=0.025, and A=0.050

(Note $\sigma_1=\sigma_2$ and $A_1+A_2+A_E=1$)

The bounds for components 1 and 2 are such that σ is constrained such that σ>0.001, yielding an Mw/Mn of approximately 2.00 and σ<0.450, yielding a Mw/Mn of approximately 5.71. The composition, A, is constrained between 0.000 and 1.000. The Mw is constrained between 2,500 g/mol and 2,000,000 g/mol. For the error component, the bounds are such that σ is constrained such that σ>0.001, yielding an Mw/Mn of approximately 2.00 and σ<0.050, yielding an Mw/Mn of approximately 2.02. The composition, A, is constrained between 0.000 and 1.000. The Mw is constrained between 2,500 g/mol and 2,000,000 g/mol.

The "GRG Nonlinear" engine was selected in Excel Solver™ and precision was set at 0.00001 and convergence was set at 0.0001. The solutions were obtained after convergence (in all cases shown, the solution converged within 60 iterations).

CDF Calculation Method

Figure 2:
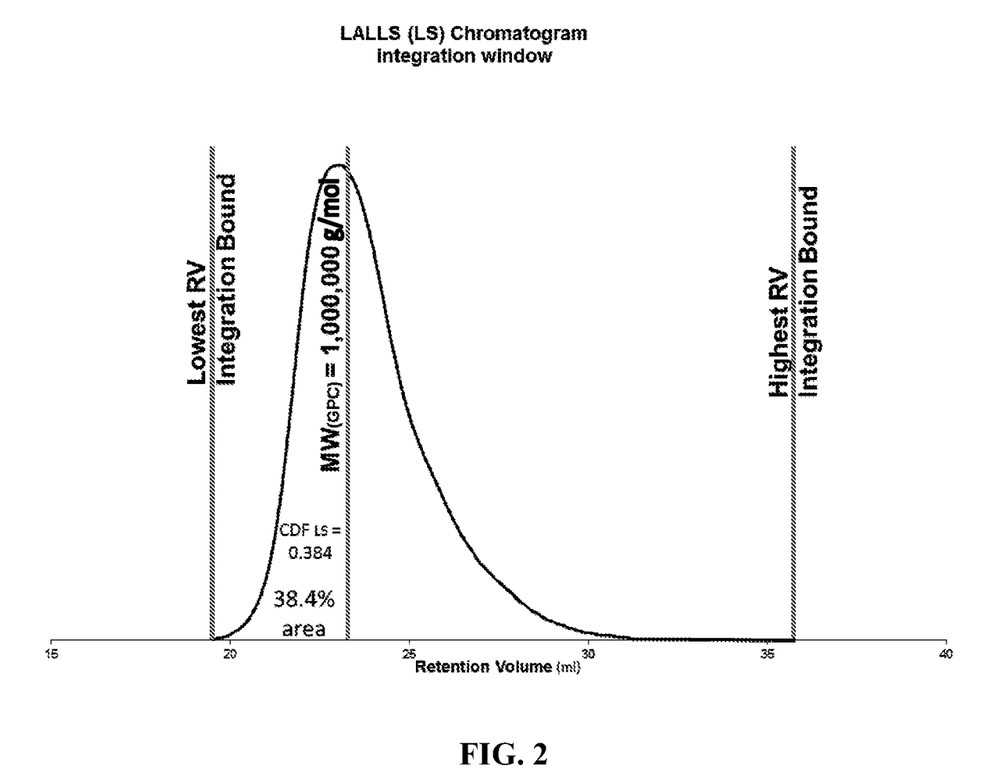
FIG. 2 is a graphical depiction of a Low Angle Laser Light Scattering (LALLS) detector chromatogram (LALLS) chromatogram integration window used in the calculation of CDF$_{LS}$ as detailed further below.

The calculation of the cumulative detector fractions (CDF) for the IR5 measurement detector ("$CDF_{IR}$") and the low angle laser light scattering detector ("$CDF_{LS}$") are accomplished by the following steps (Chromatograms for the $CDF_{IR}$ and the $CDF_{LS}$ are provided in FIGS. 1 and 2, respectively)

1) Linearly flow correct the chromatogram based on the relative retention volume ratio of the air peak between the sample and that of a consistent narrow standards cocktail mixture.

2) Correct the light scattering detector offset relative to the refractometer as described in the Gel Permeation Chromatography (GPC) section.

3) Calculate the molecular weights at each retention volume (RV) data slice based on the polystyrene calibration curve, modified by the polystyrene to polyethylene conversion factor of approximately (0.43) as described in the Gel Permeation Chromatography (GPC) section.

4) Subtract baselines from the light scattering and refractometer chromatograms and set integration windows using standard GPC practices making certain to integrate all of the low molecular weight retention volume range in the light scattering chromatogram that is observable from the refractometer chromatogram (thus setting the highest RV limit to the same index in each chromatogram). Do not include any material in the integration which corresponds to less than 150 MW in either chromatogram.

5) Calculate the cumulative detector fraction (CDF) of the IR5 Measurement sensor ($CDF_{IR}$) and LALLS chromatogram ($CDF_{LS}$) based on its baseline-subtracted peak height (H) from high to low molecular weight (low to high retention volume) at each data slice (j) according to Equations 11A and 11B:

$$CDF_{IR} = \frac{\sum_{j=RV \text{ at } 15,000 \text{ MW}}^{j=RV \text{ at Highest Integrated Volume}} H_j}{\sum_{j=RV \text{ at Lowest Integrated Volume}}^{j=RV \text{ at Highest Integrated Volume}} H_j} \quad \text{(Equation 11A)}$$

-continued $$CDF_{LS} = \frac{\sum\limits_{j=RV\ at\ Lowest\ Integrated\ Volume}^{j=RV\ at\ 1,000,000\ MW} H_j}{\sum\limits_{j=RV\ at\ Lowest\ Integrated\ Volume}^{j=RV\ at\ Highest\ Integrated\ Volume} H_j}$$ (Equation 11B)

EXAMPLES

The following examples illustrate one or more additional features of the present disclosure described above.

Referring to Table 1 below, cumulative detector fraction values were computed for a resin embodiment in accordance with the present disclosure and some comparative resins.

Hyperform® HPN-20E (commercially available from Milliken Chemical) was salt-and-pepper blended with the base HDPE materials. An amount of Mineral oil (Paralux 6001), at the 1000 ppm level, was used to stick the HPN-20E powders to the HDPE pellet surface and to obtain a well dispersed dry blend. The dry blend was next fed into the ZSK-30 for melt compounding. The ZSK-30 had ten barrel sections with an overall length of 960 mm and an L/D ratio of 32. The temperature was set at 80° C. (zone 1—feed), 160° C. (zone 2), 180° C. (zone 3), 185° C. (zone 4), 195° C. (zone 5), and 210° C. (die). The masterbatch was pelletized after the extrusion step.

The nucleaded HDPE samples were used to fabricate one liter "Boston Round"-shaped bottles with a target bottle

TABLE 1

Cumulative Detector Fractions of Various Resins

| Example | Resin | Supplier | $CDF_{IR}$ | $CDF_{LS}$ | $CDF_{IR}/CDF_{LS}$ | Density (g/cm$^3$) | $I_2$ (g/10 min) | Comment |
|---|---|---|---|---|---|---|---|---|
| Example 1 | CONTINUUM ™ DMDD-6620 NT 7 (bimodal) | The Dow Chemical Company (Midland, MI) | 0.284 | 0.384 | 0.74 | 0.958 | 0.30 | Present Embodiment |
| Comparative Example 1 | Borealis BS 2581 | Borealis AG | 0.291 | 0.522 | 0.56 | 0.958 | 0.40 | The $CDF_{IR}/CDF_{LS}$ value < 0.70 indicates too much high molecular weight tail |
| Comparative Example 2 | Exxon HDPE HD 9856B | ExxonMobil Corp. | 0.296 | 0.494 | 0.60 | 0.957 | 0.46 | The $CDF_{IR}/CDF_{LS}$ value < 0.70 indicates too much high molecular weight tail |
| Comparative Example 3 | UNIVAL ™ DMDA 6200 | The Dow Chemical Company (Midland, MI) | 0.243 | 0.254 | 0.96 | 0.953 | 0.39 | $CDF_{IR}$ value < 0.27 |
| Comparative Example 4 | Hostalen ACP 6031D | Lyondell Basell | 0.267 | 0.401 | 0.66 | 0.960 | 0.35 | $CDF_{IR}/CDF_{LS}$ value < 0.70 and a $CDF_{IR}$ value < 0.27 |
| Comparative Example 5 | Hostalen ACP 5831D | Lyondell Basell | 0.251 | 0.407 | 0.62 | 0.958 | 0.30 | $CDF_{IR}/CDF_{LS}$ value < 0.70 and a $CDF_{IR}$ value < 0.27 |
| Comparative Example 6 | Alathon L5840 | Lyondell Basell | 0.245 | 0.504 | 0.49 | 0.958 | 0.35 | $CDF_{IR}/CDF_{LS}$ value < 0.70 and a $CDF_{IR}$ value < 0.27 |
| Comparative Example 7 | Eltex® B4020N1331 | Ineos Olefins & Polymers USA | 0.187 | 0.336 | 0.56 | 0.952 | 2.2 | $CDF_{IR}/CDF_{LS}$ value < 0.70 and a $CDF_{IR}$ value < 0.27 |
| Comparative Example 8 | Exxon AA 45-004 (unimodal) | ExxonMobil Corp. | 0.223 | 0.234 | 0.95 | 0.946 | 0.32 | $CDF_{IR}$ value < 0.27 |
| Comparative Example 9 | SURPASS® HPs167-AB | Nova Chemicals | 0.417 | 0.037 | 11.4 | 0.967 | 1.2 | The $CDF_{IR}/CDF_{LS}$ value > 2.00 indicates too little high molecular weight shoulder |

Nucleated samples were prepared from a few of the above resins of Table 1, using a 30 mm co-rotating, intermeshing Coperion Werner-Pfleiderer ZSK 30™ twin screw extruder. To prepare the nucleated samples, in the first step, 1000 ppm weight of 41.0 g using a Bekum H-111 continuous extrusion blow molding machine equipped with a 50 mm extruder and MACO 6500*digital readout controller. The extruder barrel temperatures were maintained at 350° F., the extrusion rate was approximately 200-215 g/min, and the melt temperature was approximately 374° F. The bottle side wall thickness was about 22 mil.

The bottle top load was measured using a Top Load Tester-Model 17-04 (commercially available from Testing Machines, Inc. "TMI"), to determine the mechanical properties of blown thermoplastic containers when loaded under columnar crush conditions at a constant rate of compressive deflection. Bottles were conditioned at room temperature for 48 hours and placed empty on the base of the instrument in the upright position at room temperature. The experiment was conducted at a cross head speed of 2 inch/min and the deflection and load measured until the yield point was reached. Typically, five bottles were tested per sample.

Bottle impact resistance was evaluated by drop testing performed per ASTM D2463, "Standard Test Method for Drop Impact Resistance of Blow Molded Thermoplastic Containers." The bottles were filled with deionized water, capped and placed in a temperature controlled chamber set to 40° F. for a minimum of 24 hours. After conditioning, the bottles were dropped flat bottom from various heights. A standard swing-away platform was employed to enable bottles to fall straight down; however, it does not guarantee a true flat bottom drop. Data was generated and analyzed in accordance with Procedure B, Bruceton Staircase Method cited in the ASTM standard. This procedure was used to determine the mean failure height and the standard deviation of the distribution. The highest height of the drop test equipment was 14 feet.

Rectangular specimens, 9 cm×10 cm in size, were cut from the side wall of the blow molded bottles. The oxygen transmission rate (OTR) of the specimens cut from the bottle side wall were tested by a Mocon OX-TRAN® 2/21 OTR measuring instrument according to ASTM D3985 at 23° C. and 0% relative humidity (RH). The average value from the two specimens was reported in Table 2 below. OTR improvement was calculated according to the following equation:

$$OTR\ Improvement = \frac{OTR\ of\ Virgin\ Material - OTR\ of\ Nucleated\ Material}{OTR\ of\ Virgin\ Material} \quad \text{(Equation 12)}$$

tion of the HPN-20E nucleating agent can further improve the gas barrier (i.e., decrease the oxygen transmission rate) and drop test performance of the article disclosed herein. Specifically, Comparative Example 2, which is also a bimodal resin, demonstrates an earlier failure height in the drop test after the addition of nucleating agent, whereas the bimodal resin of Example 1 demonstrates a greater than 2 feet improvement in drop height after inclusion of nucleating agent.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalents.

The invention claimed is:

1. A polyethylene formulation comprising:
    a multimodal high density polyethylene (HDPE) composition, and 750 ppm to 2,500 ppm of a nucleating agent,
    wherein the multimodal HDPE composition comprises a density of 0.940 g/cm$^3$ to 0.970 g/cm$^3$ when measured according to ASTM D792, and a melt index ($I_2$) of 0.01 g/10 min. to 0.4 g/10 min. when measured according to ASTM D1238 at 190° C. and a 2.16 kg load, and
    wherein the multimodal HDPE composition comprises an infrared cumulative detector fraction ($CDF_{IR}$) of greater than 0.27 and an infrared cumulative detector fraction to light scattering cumulative detector fraction ratio ($CDF_{IR}/CDF_{LS}$) from 0.7 to 2.0,
    wherein the $CDF_{IR}$ is computed by measuring the area fraction of an IR5 measurement channel (IR) detector chromatogram less than 15,000 g/mol molecular weight using Gel Permeation Chromatography (GPC); and
    wherein the $CDF_{LS}$ is computed by measuring the area fraction of a low angle laser light scattering (LALLS) detector chromatogram greater than 1,000,000 g/mol molecular weight using GPC.

2. The polyethylene formulation of claim 1, wherein the multimodal high density polyethylene composition is a bimodal HDPE composition.

TABLE 2

Oxygen Transfer Rate and Drop Test Results

| Examples | OTR (cc · mil/100 in$^2$/day) | OTR improvement % | Average Drop Test Failure Height (feet) | Top Load (lbs) |
| --- | --- | --- | --- | --- |
| Example 1 without nucleating agent | 148.7 | — | 5.2 | 68.2 |
| Example 1 nucleated with 1000 ppm HPN-20E | 72.9 | 51 | 7.4 | 67.7 |
| Comparative Example 2 without nucleating agent | 138.4 | — | 5.4 | 68.5 |
| Comparative Example 2 nucleated with 1000 ppm HPN-20E | 77.9 | 44 | 4.9 | 68.5 |

As shown in Table 2, Example 1 exhibits an improved oxygen barrier performance and an improved drop test performance after addition of the nucleating agent, when compared to Comparative Examples 2 and 3. As shown, the samples were tested in two capacities: with and without nucleating agent. As shown and described herein, the addi- 3. The polyethylene formulation of claim 2, wherein the bimodal HDPE composition comprises a first ethylene polymer component and a second ethylene polymer component, wherein the first ethylene polymer component has a higher density than the second ethylene polymer component as determined from the following equation:

$$\frac{1}{overall.density.} = \frac{weight.fraction.of.1st.ethylene.component}{density.of.1st.ethylene.component} +$$

$$\frac{weight.fraction.of.2nd.ethylene.component}{density.of.2nd.ethylene.component}$$

and wherein the first ethylene polymer component has a lower weight-average molecular weight than the second ethylene polymer component according to GPC.

4. The polyethylene formulation of claim 3 wherein the bimodal HDPE composition comprises 60 wt. % to 40 wt. % of the first ethylene polymer component, and 40 wt. % to 60 wt. % of the second ethylene polymer component.

5. The polyethylene formulation of claim 1, wherein the nucleating agent comprises an organic nucleating agent.

6. The polyethylene formulation of claim 1, wherein the nucleating agent comprises a metal carboxylate, a metal aromatic carboxylate, a hexahydrophthalic acid metal salt, a stearate, an organic phosphate, a bisamide, sorbitol, or mixtures thereof.

7. The polyethylene formulation of claim 1, wherein the $I_2$ is from 0.1 g/10 min. to 0.5 g/10 min, and the density is from 0.950 g/cm$^3$ to 0.960 g/cm$^3$.

8. The polyethylene formulation of claim 1, wherein the polyethylene formulation comprises 10 ppm to 7,000 ppm of the nucleating agent.

9. The polyethylene formulation of claim 1, wherein the polyethylene formulation comprises 500 ppm to 1,500 ppm of the nucleating agent.

10. An article produced from the polyethylene formulation of claim 1, wherein the article comprises a molded article or a fabricated article.

11. The article of claim 10, wherein the article is a blow molded bottle, container, carton, canister, or package.

12. The article of claim 11, wherein the article is a blow molded pharmaceutical bottle or blow molded barrier bottle.

13. The article of claim 11, wherein the article has an oxygen transmission rate of less than 100 cc·mil/(100 in$^2$)/day when measured at 23° C. and 0% relative humidity according to ASTM D3985.

14. A blow molded article comprising the polyethylene formulation of claim 1.

15. A method of making a pharmaceutical bottle comprising:

forming the polyethylene formulation of claim 1 into the pharmaceutical bottle by using at least one of an extrusion blow molding process, an injection blow molding process, or a compression blow forming process.

* * * * *